United States Patent Office 3,336,335
Patented Aug. 15, 1967

3,336,335
VAPOR PHASE SYNTHESIS OF BENZOTHIOPHENE AND DERIVATIVES THEREOF
Harold A. Kaufman, Piscataway Township, New Brunswick County, and Harold M. Foster, Middlesex, N.J., assignors to Mobil Oil Corporation, a corporation of New York
No Drawing. Filed Mar. 25, 1965, Ser. No. 442,770
12 Claims. (Cl. 260—330.5)

This invention relates to the synthesis of benzothiophene and substituted benzothiophene. It is more particularly concerned with an improved vapor phase process for making benzothiophene and its derivatives from substituted aliphatic-benzenes.

As is well known to those familiar with the art, it has been proposed to produce benzothiophene and certain substituted derivatives by catalytic vapor phase reaction between hydrogen sulfide and a styrene or an ethyl-benzene reactant. The prior art consistently teaches, however, that it is necessary that the cyclic compound reactant (styrene or ethylbenzene) have a hydrogen atom on a nuclear carbon atom adjacent to the carbon atom bearing the aliphatic side chain, i.e., in the ortho position.

Benzothiophene and its derivatives are starting materials in the manufacture of dyes and photosensitizers (U.S. Patent No. 2,424,483). They are also used to prepare ataractic, anti-depressant and hypotensive agents (U.S. Patent No. 3,010,972).

It is the discovery of this invention that, contrary to the prior art teaching, superior yields are obtained in the catalytic vapor phase reaction with hydrogen sulfide, or other labile sulfur-containing compound, when there is at least one halogen atom ortho to the aliphatic side chain.

Accordingly, it is a broad object of this invention to provide an improved process for producing benzothiophene and derivatives thereof. Another object is to provide an improved process for reacting hydrogen sulfide or other labile sulfur-containing compound with an alkyl- or alkenyl-substituted benzene compound to produce benzothiophene or a derivative thereof. A specific object is to provide a vapor phase catalytic process for reacting a labile sulfur-containing compound with an alkyl- or alkenyl-benzene compound having at least one halogen atom in the ortho position. Other objects and advantages of this invention will become apparent to those skilled in the art, from the following detailed description.

The present invention provides a process for producing benzothiophene and substituted derivatives thereof, that comprises reacting, in the vapor phase, a compound having the formula:

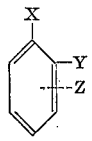

wherein X is a halogen atom, Cl, Br, or I; Y is selected from the group consisting of

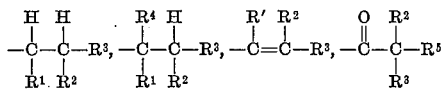

and —C≡C—R², wherein R', R², and R³ are H, lower akyl (C₁–C₃), Cl, Br, I, SH, or OH, R⁴ is Cl, Br, I, OH, or SH, and R⁵ is H, Cl, Br, I OH or SH; Z is H methoxy, Br, Cl, I, or lower alkyl (C₁–C₃); with a labile sulfur-containing compound, thermally or in contact with a dehydrogenation catalyst, a compound of a metal of the first transition series of the Periodic Chart of the elements.

The primary reactant in the process of this invention is an alkyl or alkenyl benzene compound having a halogen atom in at least one ortho position, with respect to the alkyl or alkenyl group. This compound has the structural formula:

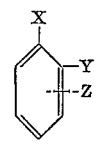

wherein X, Y, and Z are as aforedescribed. Non-limiting examples of this reactant are 2-chlorostyrene; 2-bromoethylbenzene; 2,6-dichlorostyrene; 2,6-diiodostyrene; 2,6-dichloroethylbenzene; 2-bromo-6-methoxystyrene; 2,6-dichloro-α-methylstyrene; 2-chloro-6-methoxy - β-methylstyrene; 2,6-dichloroacetophenone; 2,6-dichloro-α-methyl toluenethiol; 2-chlorophenyl ethanethiol; 2,6-dichlorophenyl methyl carbinol; 2-chloro-α-methylbenzyl chloride; and 2-chlorophenethyl chloride.

The other reactant in the present process is a source of sulfur, i.e., a sulfur-containing compound. In order to be utilizable in the vapor phase process, this compound must be thermally labile (vaporizable) at the reaction temperature. Hydrogen sulfide is the preferred reactant. Other vaporizable sulfur-containing compounds are contemplated, however, such as sulfur dioxide, carbonyl sulfide, and the like. The molar ratio of sulfur-containing compound reactant (e.g. hydrogen sulfide) to the benzene compound reactant will be between about 2:1 and about 8:1.

The catalyst used in this vapor phase process is at least one compound, preferably an oxide or sulfide, of a metal of the first transition series of metals of the Periodic Chart of the Elements. The Periodic Chart referred to is that set forth in Lange's Handbook of Chemistry, Sixth Edition (1946). The preferred metals are titanium, vanadium, chromium, manganese, iron cobalt, and nickel. Non-limiting examples of the utilizable catalysts are chromic oxide, nickel-tungsten sulfide, titanium dioxide, vanadium pentoxide, maganic oxide, vanadium trisulfide, ferric oxide, ferrous sulfide, cobaltic oxide, and nickel sesquioxide. Although these catalytic compounds can be used per se, they usually are used on a suitable support, such as alumina, silica, magnesia, clay, charcoal, activated carbon, pumice, etc. The content of catalytic compound, in the preferred supported catalyst will be between about 15 percent and about 35 percent, by weight of the supported catalyst. The cyclization can also be achieved thermally.

The vapor phase process of this invention is carried out at a temperature of between about 300° C. and about 750° C., preferably between about 550° C. and about 725° C. At the more elevated temperatures within this range, the reaction proceeds thermally and a catalyst is not needed. The contact time of the reactants with the catalyst will be between about 0.1 second and 1 second. In preferred continuous processing, this corresponds to an LHSV (volume liquid reactant per volume catalyst per hour), based upon the substituted benzene compound reactant, of between about .4 and about 2.5.

The following examples are for the purpose of demonstrating the vapor phase process of this invention. It will be appreciated that other catalysts and reactants can be used, as discussed hereinbefore, and as those skilled in the art will readily understand.

EXAMPLE 1

A mixture of hydrogen sulfide and o-chlorostyrene, in a molar ratio of hydrogen sulfide to o-chlorostyrene of 4.5:1, was preheated to about 300° C. Then, the heated mixture was passed through a reactor containing fixed bed of catalyst, chromic oxide on alumina containing 19 weight percent chromic oxide, at a temperature of about 500° C. at atmospheric pressure. The charge rate was adjusted to afford a contact time of 0.3 second (2.24 LHSV). The effluent contained 21 weight percent benzothiophene and 66 weight percent unreacted, recyclable o-chlorostyrene. Only a trace amount of 4-chlorobenzothiophene was found.

EXAMPLES 2 THROUGH 7

In a manner similar to that described in Example 1, other reactants and $H_2S$ were contacted with the chromic oxide on alumina catalyst with the exception of Example 7. The run of Example 7 was carried out thermally using inert alundum beads in place of chromic oxide catalyst. The pertinent data and yields are summarized in the following table:

| Example | Reactant | Reaction Temp., C. | Product | Yield per Pass, wt. Percent |
|---|---|---|---|---|
| 2 | 2-chloroethylbenzene | 500 | Benzothiophene | 8 |
| 3 | 2,6-dichlorostyrene | 500–600 | 4-chlorobenzothiophene | 9–13 |
| 4 | do | 720 | do | 16 |
| 5 | 2,6-dichlorophenyl methyl carbinol | 500 | do | 20 |
| 6 | 2,6-dichloro-α-methyl-α-toluenethiol | 500 | do | 40 |
| 7 | 2,6-dichloroethylbenzene | 720 | do | 10 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing benzothiophene and substituted derivatives thereof that comprises reacting, in the vapor phase, a compound selected from the group consisting of 2-chlorostyrene; 2-bromoethylbenzene; 2,6-dichlorostyrene; 2,6-diiodostyrene; 2,6-dichloroethyl-benzene; 2,6 - dichloroacetophenone; 2,6 - dichloro-alpha-methyl toluenethiol; 2-chlorophenyl ethanethiol; 2,6-dichloro-phenyl methyl carbinol; 2-chloro-alpha-methylbenzyl chloride; and 2-chlorophenethyl chloride with a labile sulfur-containing compound selected from the group consisting of $H_2S$, COS, and $SO_2$.

2. The process defined in claim 1 carried out in contact with, as a dehydrogenation catalyst, a compound selected from the group consisting of oxides and sulfides of a metal of the first transition series of the Periodic Chart of the elements.

3. A process for producing benzothiophene that comprises reacting, in the vapor phase, o-chlorostyrene with a labile sulfur-containing compound selected from the group consisting of $H_2S$, COS, and $SO_2$, in contact with, as a dehydrogenation catalyst, a compound selected from the group consisting of oxides and sulfides of a metal of the first transition series of the Periodic Chart of the elements.

4. The process defined in claim 3, wherein said sulfur-containing compound is hydrogen sulfide and said catalyst is chromic oxide.

5. A process for producing 4-chlorobenzothiophene that comprises reacting, in the vapor phase, 2,6-dichlorostyrene with a labile sulfur-containing compound selected from the group consisting of $H_2S$, COS, and $SO_2$, in contact with, as a dehydrogenation catalyst, a compound selected from the group consisting of oxides and sulfides of a metal of the first transition series of the Periodic Chart of the elements.

6. The process defined in claim 5, wherein said sulfur-containing compound is hydrogen sulfide and said catalyst is chromic oxide.

7. A process for producing 4-chlorobenzothiophene that comprises reacting, in the vapor phase, 2,6-dichlorophenyl methyl carbinol with a labile sulfur-containing compound selected from the group consisting of $H_2S$, COS, and $SO_2$, in contact with, as a dehydrogenation catalyst, a compound selected from the group consisting of oxides and sulfides of a metal of the first transition series of the Periodic Chart of the elements.

8. The process defined in claim 7, wherein said sulfur-containing compound is hydrogen sulfide and said catalyst is chromic oxide.

9. A process for producing 4-chlorobenzothiophene that comprises reacting, in the vapor phase, 2,6-dichloro-α-methyl-α-toluenethiol with a labile sulfur-containing compound selected from the group consisting of $H_2S$, COS, and $SO_2$, in contact with, as a dehydrogenation catalyst, a compound selected from the group consisting of oxides and sulfides of a metal of the first transition series of the Periodic Chart of the elements.

10. The process defined in claim 9, wherein said sulfur-containing compound is hydrogen sulfide and said catalyst is chromic oxide.

11. A process for producing 4-chlorobenzothiophene that comprises reacting, thermally and in the vapor phase, 2,6-dichloroethylbenzene with a labile sulfur-containing compound selected from the group consisting of $H_2S$, COS, and $SO_2$.

12. The process defined in claim 11, wherein said sulfur-containing compound is hydrogen sulfide.

No references cited.

WALTER A. MODANCE, *Primary Examiner.*
JOHN D. RANDOLPH, *Examiner.*
CECILIA M. SHURKO, *Assistant Examiner.*